United States Patent
Zhang et al.

(10) Patent No.: US 11,062,065 B2
(45) Date of Patent: Jul. 13, 2021

(54) METHOD AND APPARATUS FOR OBTAINING MATCHING PROCESS RESULTS AMONG MULTIPLE REACTION CHAMBERS

(71) Applicant: BEIJING NAURA MICROELECTRONICS EQUIPMENT CO., LTD., Beijing (CN)

(72) Inventors: Jihong Zhang, Beijing (CN); Jinsheng Fu, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/883,766

(22) Filed: May 26, 2020

(65) Prior Publication Data

US 2020/0285790 A1    Sep. 10, 2020

Related U.S. Application Data

(63) Continuation of application No. PCT/CN2018/113013, filed on Oct. 31, 2018.

(30) Foreign Application Priority Data

Nov. 28, 2017  (CN) .......................... 201711223402.8

(51) Int. Cl.
  *G06F 30/30*    (2020.01)
  *G06F 119/18*    (2020.01)
(52) U.S. Cl.
  CPC .......... *G06F 30/30* (2020.01); *G06F 2119/18* (2020.01)

(58) Field of Classification Search
  CPC ...................................................... G06F 30/30
  (Continued)

(56) References Cited

U.S. PATENT DOCUMENTS

| 2002/0199082 A1* | 12/2002 | Shanmugasundram ..................... B24B 37/042 712/208 |
| 2005/0171626 A1 | 8/2005 | Schwarm |

(Continued)

FOREIGN PATENT DOCUMENTS

| CN | 101446804 A | 6/2009 |
| CN | 101556460 A | 10/2009 |

(Continued)

OTHER PUBLICATIONS

The World Intellectual Property Organization (WIPO) International Search Report for PCT/CN2018/113013 dated Jan. 22, 2019, 6 Pages.

*Primary Examiner* — Eric D Lee
(74) *Attorney, Agent, or Firm* — Anova Law Group, PLLC (57) ABSTRACT

A matching method for multiple reaction chambers includes selecting at least one factor, setting an adjustment coefficient for the factor corresponding to each of the reaction chambers, and obtaining an input value of the factor to enter into each reaction chamber based on the target value of the factor and the adjustment coefficient corresponding to each of the reaction chambers. The processing factor has a target value and a real value corresponding to each of the reaction chamber. The adjustment coefficient is based on the real value and the target value of the factor being within a preset accuracy range when the corresponding chamber operates a process.

16 Claims, 6 Drawing Sheets

(58) Field of Classification Search
USPC .......................................................... 716/54
See application file for complete search history.

(56) References Cited

U.S. PATENT DOCUMENTS

| | | | |
|---|---|---|---|
| 2007/0021859 A1 | 1/2007 | Lev-Ami et al. | |
| 2008/0115560 A1* | 5/2008 | Shareef | G01F 25/0053 73/1.25 |
| 2010/0071438 A1* | 3/2010 | Davis | G01F 1/667 73/1.34 |

FOREIGN PATENT DOCUMENTS

| | | |
|---|---|---|
| CN | 101840207 A | 9/2010 |
| CN | 101859695 A | 10/2010 |
| CN | 102063063 A | 5/2011 |
| CN | 102243494 A | 11/2011 |
| CN | 103155101 A | 6/2013 |
| CN | 103838202 A | 6/2014 |
| CN | 104008945 A | 8/2014 |
| CN | 104332435 A | 2/2015 |
| CN | 104991581 A | 10/2015 |
| CN | 106328550 A | 1/2017 |
| CN | 106409721 A | 2/2017 |
| CN | 107256820 A | 10/2017 |
| CN | 107968042 A | 4/2018 |
| TW | 201740076 A | 11/2017 |

\* cited by examiner

METHOD AND APPARATUS FOR OBTAINING MATCHING PROCESS RESULTS AMONG MULTIPLE REACTION CHAMBERS

CROSS-REFERENCE TO RELATED APPLICATION

This application is a continuation of International Application No. PCT/CN2018/113013, filed on Oct. 31, 2018, which claims priority to Chinese Application No. 201711223402.8 filed on Nov. 28, 2017, the entire content of both of which is incorporated herein by reference.

TECHNICAL FIELD

The present disclosure relates to the semiconductor manufacturing technology field and, more particularly, to a method and apparatus for obtaining matching process results among multiple reaction chambers.

BACKGROUND

When using clustered semiconductor equipment, one machine is usually equipped with multiple (2 to 6) reaction chambers. These reaction chambers have same hardware structures, use a same transmission platform to transfer silicon wafers, and use the same software to perform different or same processes.

In a manufacturing process, to ensure product quality, multiple chambers are required to run the same process to produce products with the same results. Since slight differences of the hardware structures and hardware installations of the multiple chambers exist, these differences cause matching, and the adjustment among the multiple chambers to become relatively complicated and difficult.

Figure 1:
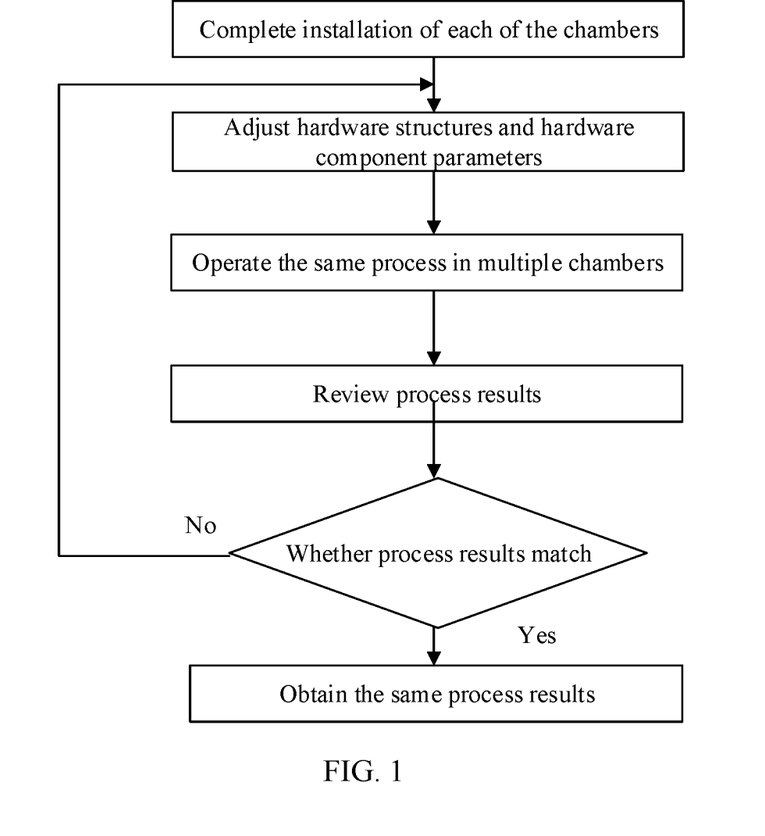
FIG. 1 is a flowchart of a matching and adjustment method of a reaction chamber in the prior art.

In the installation and adjustment processes, with reference to FIG. 1, the matching and adjustment among the multiple chambers are often include adjusting parameters of the hardware structures and hardware components, operating the same processes, and reviewing process results. By repeating the above-mentioned processes, a plurality of tests and process result adjustments are done, such that the chambers mostly match with each other.

Embodiments of the present disclosure address the following requirements and issues.

1. Semiconductor equipment has a very high requirement for accuracy. Adjusting the hardware structures of the multiple chambers has a very high requirement for hardware components. Because there are many hardware components, errors of hardware assembly are relatively complicated, which leads to inevitable differences among different hardware structures. Therefore, the matching of multiple chambers by hardware adjustment is difficult to implement.

2. A method of using a process testing piece to operate the process and adjust the process results requires a relatively large amount of time, manpower, and material resources. When the process changes, the matching of the multiple chambers is often required to be repeated.

SUMMARY

Embodiments of the present disclosure provide a matching method for multiple reaction chambers. The method includes selecting at least one factor, setting an adjustment coefficient for the factor corresponding to each of the reaction chambers, and obtaining an input value of the factor to enter into each reaction chamber based on the target value of the factor and the adjustment coefficient corresponding to each of the reaction chambers. The processing factor has a target value and a real value corresponding to each of the reaction chamber. The adjustment coefficient is based on the real value and the target value of the factor being within a preset accuracy range when the corresponding chamber operates a process.

Embodiments of the present disclosure provide a matching apparatus for multiple reaction chambers. The apparatus includes a selection device, a setting device, and a matching device. The selection device is configured to select one processing factor. The processing factor has a target value and a real value corresponding to each of the reaction chamber. The setting device is configured to set an adjustment coefficient for the factor for each of the reaction chambers. The adjustment coefficient is based on the real value and the target value of the factor being within a preset accuracy range when the corresponding reaction chamber operates a process. The matching device is configured to obtain an input value of the factor to enter into each reaction chamber based on the target value of the factor and the adjustment coefficient corresponding to each of the reaction chambers.

DETAILED DESCRIPTION OF THE EMBODIMENTS

To illustrate the purposes, technical solutions, and advantages of the present disclosure, the present disclosure is further described in detail as follows in connection with specific embodiments and with reference to drawings. The description is merely exemplary but does not intend to limit scope of the present disclosure. In the following description, the description of well-known structures and technologies are omitted to avoid unnecessarily obscuring concepts of the present disclosure.

Clustered semiconductor equipment usually has multiple (2 to 6) reaction chambers with the same hardware structure.

With the multiple reaction chambers under the control of a control apparatus of the clustered semiconductor equipment, transmission apparatus transfer to-be-processed workpieces among each of the reaction chambers. Each of the reaction chambers may perform same or different processes. These processes include the processes such as cleaning, etching, deposition, etc., which complete various process tasks.

For the same reaction chambers, the hardware structures of the reaction chambers are theoretically the same. But in manufacturing processes, due to a large number and variety of parts of the reaction chambers, slight differences among structures of these parts exist. The process of installing the parts also brings errors, which cause slight differences among the hardware structures of the reaction chambers. These differences make the matching and adjustment among the multiple chambers complicated and difficult. To solve this problem, the present disclosure provides a method for obtaining matching the process results among multiple chambers. The method includes adjusting factors that can affect the process results to improve the matching effect of the reaction chambers. For the processes such as etching, deposition, etc., in the semiconductor field, the method uses the unit of nanometers (nm), which has a very high requirement for accuracy. Many factors exist, such as radio frequency (RF) power, process gas flow, chamber temperature, etc., which can affect the process results.

Figure 2:
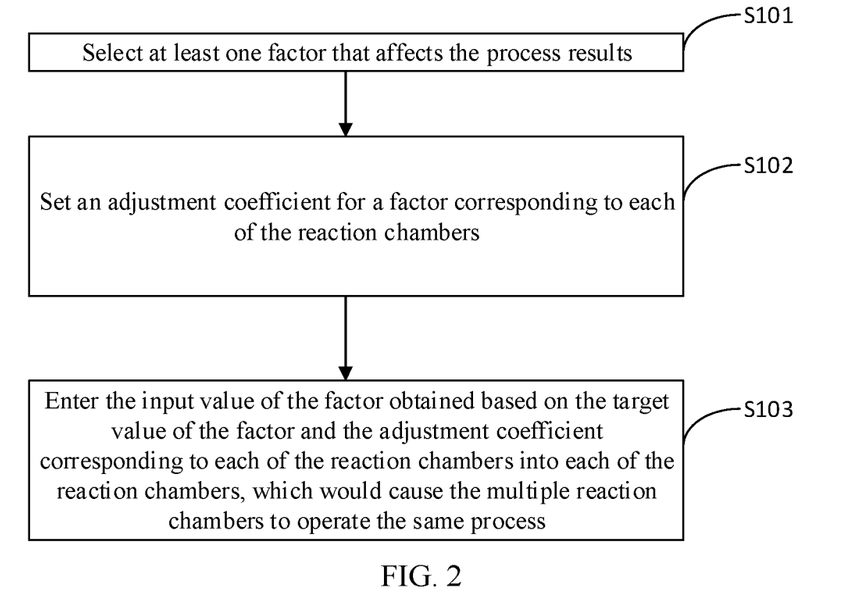
FIG. 2 is a flowchart of a method for obtaining matching process results among the multiple reaction chambers provided by a first embodiment of the present disclosure.

With reference to FIG. 2, a first embodiment of the present disclosure provides a method for obtaining matching the process results among the multiple reaction chambers. The method includes following processes.

At S101, the method includes selecting at least one factor that affects the process results.

The factor is a processing parameter of the reaction chambers. By adjusting the processing parameter, the process results can be changed.

In various implementations, the manufacturing errors among the hardware structures of the multiple reaction chambers, and the installation errors of the hardware structures, etc., often cause differences among the target processing parameter values of the reaction chambers (hereafter referred to as target values) and the actual processing parameter values of the reaction chambers (hereafter referred to as real values). As such, the multiple chambers may have mismatching process results.

In one embodiment, the factors may be the processing parameters such as the radio frequency (RF) power, process gas flow, chamber temperature, etc. At process S101, the method includes selecting at least one of the plurality of factors such as radio frequency (RF) power, process gas flow, chamber temperature, etc. The RF power may include RF power applied to the to-be-processed workpieces by a lower electrode, RF power to stimulate process gas, and/or RF power applied to a target by an upper electrode, etc., and include all RF power as long as it affects the process results. The process gas may be a gas such as argon, etc. These processing parameters form the process operating condition of the reaction chambers. The process operating condition may be represented as follows: $S=P1+P2+P3+\ldots+Pn$, where S denotes the process operating condition of the reaction chambers, P1, P2, P3, ..., P4 denote the factors that affect the process results.

At S102, the method includes setting an adjustment coefficient for a factor corresponding to each of the reaction chambers. The method includes setting the adjustment coefficient to keep the difference of the real value and the target value of the factor to be within a preset accuracy range, when the corresponding reaction chamber operates the process.

The process S102 further includes the following sub-processes.

At S102a, the method includes setting the target value of the factor when the corresponding reaction chamber operates the process.

The target values of the factor for the multiple reaction chambers are the same.

At S102b, the method includes using the target value of the factor as an input value of the factor and enter the input into each of the reaction chambers to cause the multiple reaction chambers to perform the same process.

In the sub-process, the method includes using the target value of the factor as the input value of the factor and inputting the input value to each of the reaction chambers. When operating the process, the method can make each of the reaction chambers to satisfy the process operating condition corresponding to the above-mentioned target value.

At S102c, the method includes detecting and recording the real value of the factor, when the corresponding reaction chambers operates the process.

In some embodiments, for the factor of the RF power, the target value of the RF power may be set for each of the reaction chambers. When operating the process, after each of the reaction chambers receives the target value, the RF power assembly provides the RF power with the target value to the reaction chambers, and the method includes determining the real value of the RF power of each of the reaction chambers.

For the factor of the process gas flow, the method includes setting the target value of the process gas flow for each of the reaction chambers. When operating the process, after each of the reaction chambers receives the target value, a gas source provides process gas with flow at the target value to the reaction chambers. The method includes detecting a gas pressure change of each of the reaction chambers to calculate the real value of the process gas flow. For other factors, the process of detecting the real value is similar. The method includes, for example, detecting the factors by using corresponding sensors configured in the reaction chambers.

At S102d, the method includes obtaining the adjustment coefficient by applying a fitting method according to the difference between the target value and the real value.

In this sub-process, the fitting method may be a linear fitting method. The adjustment coefficient may be an adjustment coefficient. For example, for the RF power, assume that the target value is P1, and the real value is P1', the adjustment coefficient K1 is P1/P1'. For example, the target value of the RF power is 100 w, and the real value of the RF power is 90 w, so K1=100/90, and the adjustment coefficient K1 is 1.11. Similarly, for the process gas flow, the adjustment coefficient K2 can be calculated through the linear fitting. Other adjustment coefficients of other factors can also be obtained with the similar method to obtain the adjustment coefficients of all the factors K1, K2, ..., Kn. Based on the adjustment coefficients, the process operating condition of the adjusted reaction chambers may be represented as: $S=K1P1+K2P2+K3P3+\ldots+KnPn$.

In complex situations, the target value and the real value do not have a linear fitting relationship but may have a complex function relationship such as a parabolic relationship. In these cases, a non-linear fitting method such as curve fitting may be implemented, and a fitted function relationship may be used as the adjustment coefficient.

In addition, due to the hardware structure and hardware installation errors among the reaction chambers, even if the same target value is set for the factor of each of the reaction chambers, the adjustment coefficient of the same factor may be different when each of the reaction chambers operates the process.

By using the adjustment coefficients to adjust the factor corresponding to each of the reaction chambers, the real values of the factor of the reaction chambers can be made the same or at least substantially same. That is, the difference between the real value and the target value of each of the reaction chambers satisfies the preset accuracy range. The preset accuracy range depends more on a fitting accuracy. The preset accuracy ranges of the different factors are different. The preset accuracy ranges may be less than 0.5, preferably less than 0.1.

The same target value may be set for the factor of each of the reaction chambers. Different target values may be set too, as long as the difference between the real value and the target value of the factor of each of the reaction chambers would be within the preset accuracy ranges.

At S103, the method includes entering the input value of the factor obtained based on the target value of the factor and the adjustment coefficient corresponding to each of the reaction chambers into each of the reaction chambers, which would cause the multiple reaction chambers to operate the same process.

In some embodiments, the method includes using products, quotients, differences, or sums of the target values of the factors and the adjustment coefficients corresponding to each of the reaction chambers as the input values and entering the input values into each of the reaction chambers.

Taking the product of the target value of the factor and the adjustment coefficient corresponding to each of the reaction chambers as an example, if the adjustment coefficient K1 is 1.11, and the target value is 100 w, during the normal process, the control apparatus calls the adjustment coefficient K1 and multiple the target value 100 w by the adjustment coefficient K1 to obtain 111 w as the input value for the reaction chamber. It can be calculated that the real value of the RF power of the reaction chamber is 99.9 w, which almost reaches the target value of 100 w. The difference between the real value and the target value is in the preset accuracy range, and the process results of the reaction chamber are ensured to be the same.

Figure 3:
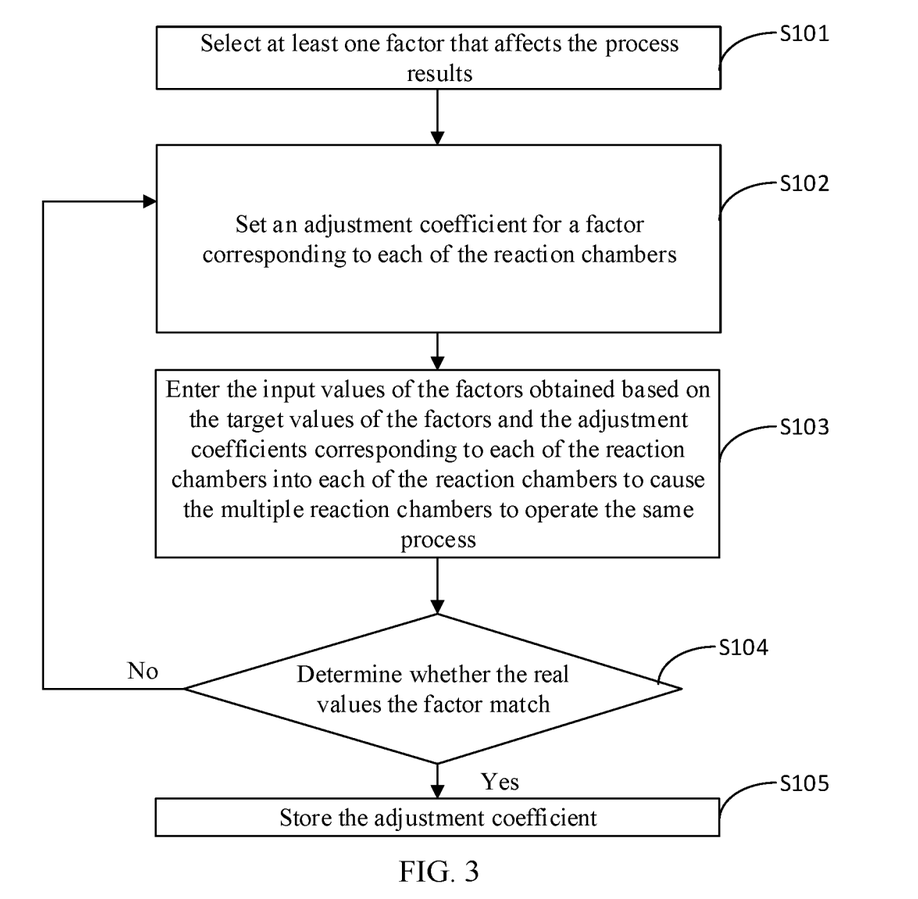
FIG. 3 is a flowchart of another method for obtaining matching process results among the multiple reaction chambers provided by the first embodiment of the present disclosure.

With reference to FIG. 3, after S103, the following processes are included.

At S104, the method includes determining whether the real values of the factors corresponding to the multiple reaction chambers match.

If the real values of the factors match, the method proceeds to S105. That is, the adjustment coefficients are stored.

If the real values of the factors do not match, the method returns to S102, and the adjustment coefficients are adjusted at S102 until the process results of the multiple reaction chambers match.

Figure 4:
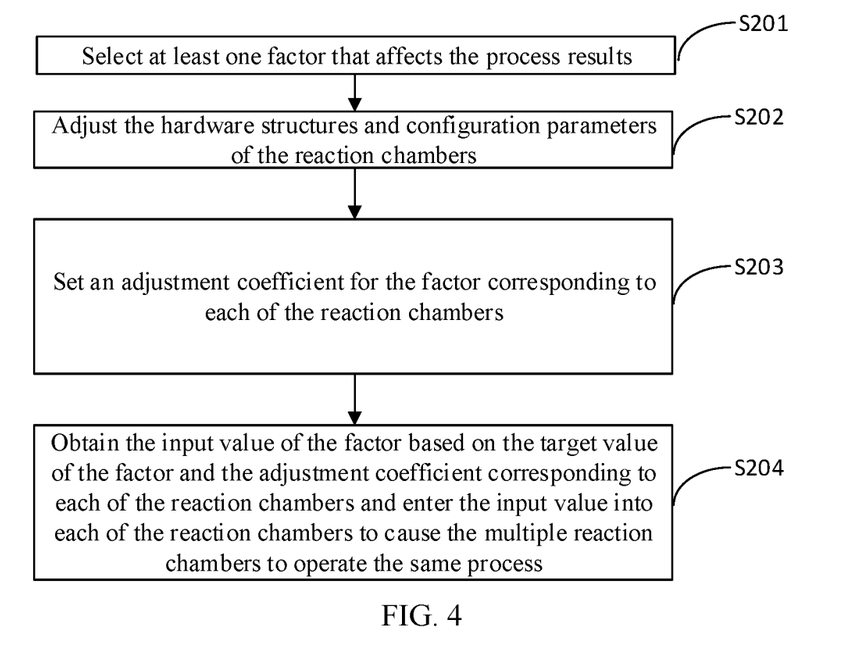
FIG. 4 is a flowchart of a method for obtaining matching process results among the multiple reaction chambers provided by a second embodiment of the present disclosure.

With reference to FIG. 4, a second embodiment of the present disclosure provides a method for obtaining matching process results among the multiple reaction chambers. The method includes the following processes.

At S201, the method includes selecting at least one factor which affects the process results.

At S202, the method includes adjusting the hardware structures and configuration parameters of the reaction chambers.

At S203, the method includes setting an adjustment coefficient for the factor corresponding to each of the reaction chambers. The adjustment coefficient would control the difference between the real value and the target value to be in the preset accuracy range when the corresponding reaction chamber operates the process.

At S204, the method includes obtaining the input value of the factor based on the target value of the factor and the adjustment coefficient corresponding to each of the reaction chambers and entering the input value into each of the reaction chambers to enable the multiple reaction chambers to operate the same process.

Comparing the present embodiment with the first embodiment, the difference is that the process of adjusting the hardware structure and the configuration parameters of each of the reaction chambers is added before S203. In this embodiment, the other processes are the same as the processes in the first embodiment, which are not repeated here.

The hardware structure of the reaction chamber is well known to those skilled in the art and includes but not limited to various components of the reaction chamber such as a chamber body, a lower electrode structure, an upper electrode structure, etc. Adjusting the hardware structure usually includes adjusting a hardware installation position to ensure a hardware position accuracy meet the requirement. Adjusting the hardware configuration parameters includes adjusting the hardware input and output to satisfy the requirements of the process condition.

By adjusting the hardware structures and hardware configuration parameters to improve the consistency of the hardware structures of the reaction chambers, the method consistent with the present disclosure reduces the impact of the hardware structure errors and the hardware structure installation errors to the process results as much as possible. This is beneficial for the consistency of the process results of the reaction chambers.

Figure 5:
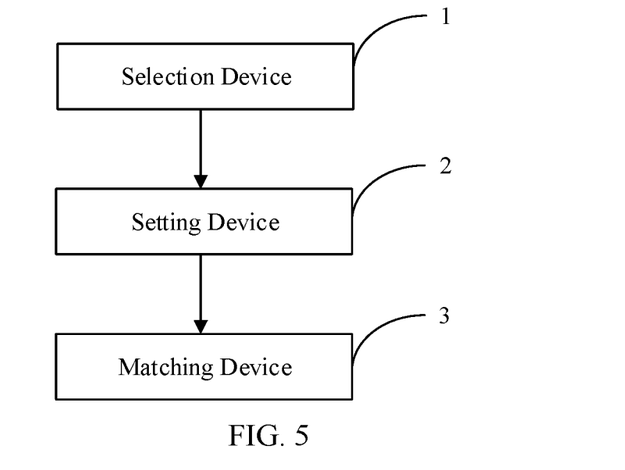
FIG. 5 is a block diagram of an apparatus for obtaining matching process results among multiple reaction chambers provided by a third embodiment of the present disclosure.

With reference to FIG. 5, a third embodiment of the present disclosure provides an apparatus for obtaining matching process results among multiple reaction chambers. The apparatus includes a selection device 1, a setting device 2, and a matching device 3.

The selection device 1 is configured to select at least one factor, which affects the process results.

The setting device 2 is configured to set an adjustment coefficient for the factor corresponding to each of the reaction chambers. The adjustment coefficient controls the difference between the real value and target value of the factor to be in the preset accuracy range when the corresponding reaction chamber operates the process.

The matching device 3 is configured to obtain the input value of the factor based on the target value of the factor and the adjustment coefficient corresponding to each of the reaction chambers, enter the input value into each the reaction chamber, and cause the multiple reaction chambers to operate the same process.

In some embodiments, the matching device 3 is configured to use the product of the target value of the factor and the adjustment coefficient corresponding to each of the reaction chambers as the input value of the factor, enter the input value into each of the reaction chambers, and enable the multiple reaction chambers to operate the same process.

In some embodiments, the above-mentioned factor includes the RF power, process gas flow, chamber temperature, etc.

Figure 6:
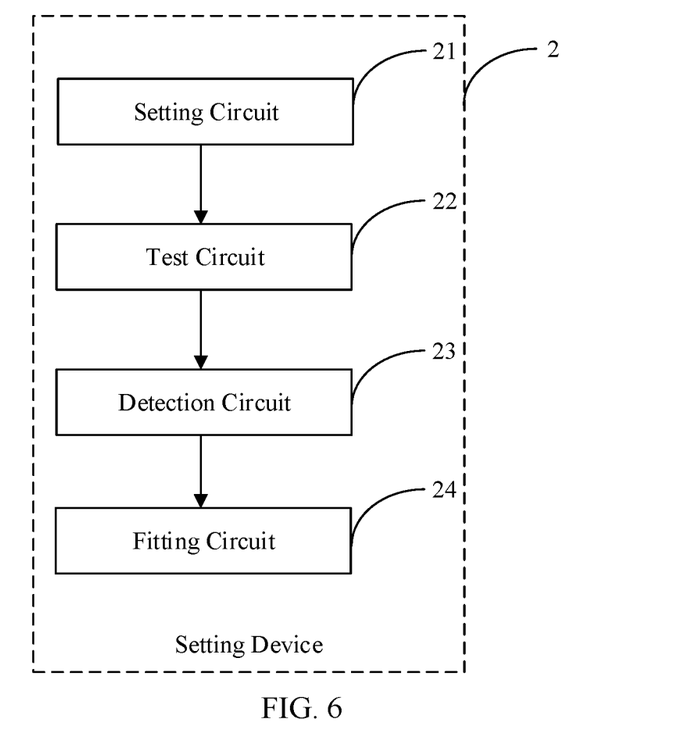
FIG. 6 is a block diagram of a setting device used by the third embodiment of the present disclosure.

In one embodiment, with reference to FIG. 6, the setting device 2 includes a setting circuit 21, a test circuit 22, a detection circuit 23, and a fitting circuit 24. The setting circuit 21 is configured to set the target value of the factor when the corresponding reaction chamber operates the process. The test circuit 22 is configured to use the target value of the factor as the input value of the factor, enter the input value into each of the reaction chamber, and cause the multiple reaction chambers to operate the same process. The detection circuit 23 is configured to detect and record the real value of the factor, when the corresponding reaction chamber operates the process. The fitting circuit 24 is configured to obtain the adjustment coefficient through the fitting method according to the difference between the target value and the real value.

In some embodiments, the fitting method may be a linear fitting or a curve fitting method.

Figure 7:
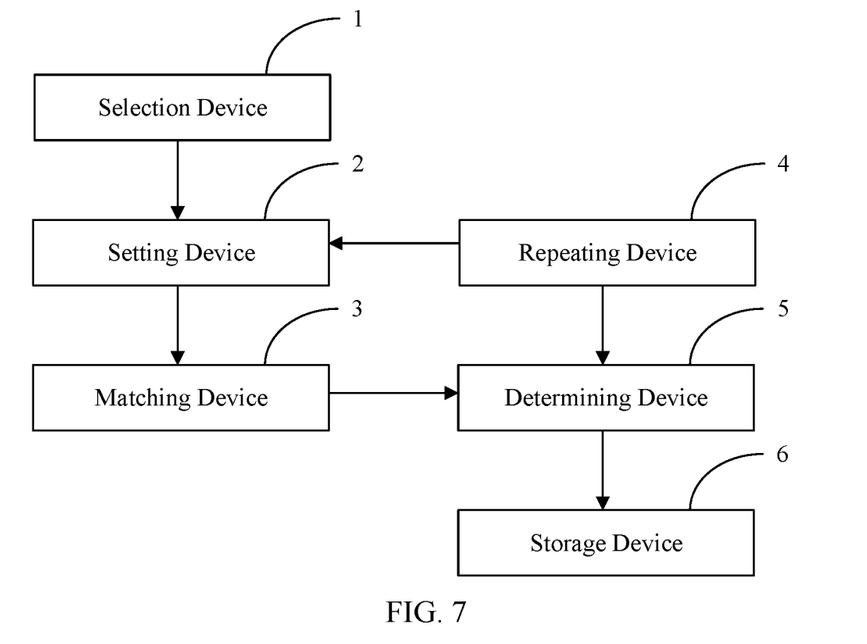
FIG. 7 is another block diagram of the apparatus for obtaining matching process results among multiple reaction chambers provided by the third embodiment of the present disclosure.

In one embodiment, with reference to FIG. 7, the apparatus further includes a determining device 5, a storage device 6, and a repeating device 4. The determining device 5 is configured to determine whether the real values of the factor corresponding to the multiple reaction chambers match. If the real values match, the apparatus triggers the storage device 6, otherwise it triggers the repeating device 4. The storage device 6 is configured to store the adjustment coefficient. The repeating device 4 is configured to trigger the setting device 2 to adjust the adjustment coefficient until the process results of the multiple reaction chambers match.

Figure 8:
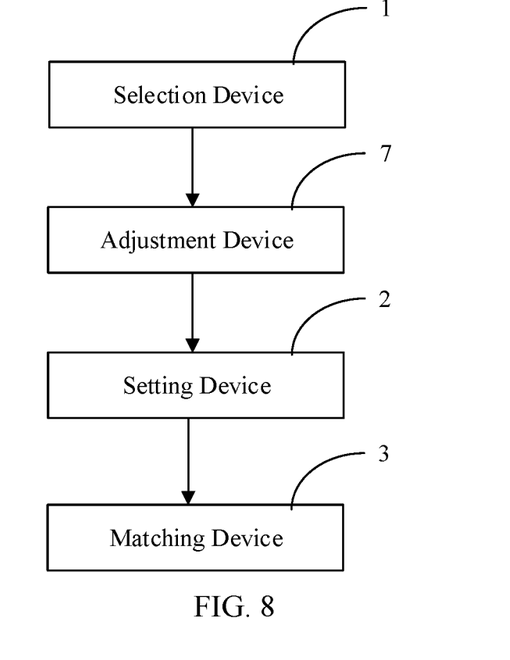
FIG. 8 is a block diagram of an apparatus for obtaining matching process results among the multiple reaction chambers provided by the fourth embodiment of the present disclosure.

With reference to FIG. 8, a fourth embodiment of the present disclosure provides an apparatus for obtaining matching the process results among the multiple reaction chambers. The apparatus also includes a selection device 1, a setting device 2, and a matching device 3. These devices have the same functions as the devices mentioned in the third embodiment, which are not repeated here. The differences between the embodiment and the above-mentioned third embodiment are described in detail as follows.

In some embodiments, the apparatus provided by the embodiment further includes an adjustment device 7, which is configured to adjust the hardware structures and hardware configuration parameters of the reaction chambers.

The above-mentioned adjustment device 7 may include a structure adjustment sub-device and a parameter adjustment sub-device. The structure adjustment sub-device is configured to adjust the assembly position of the hardware, such that the position accuracy of the hardware meets the requirement. The parameter adjustment sub-device may be configured to adjust an input and an output of the hardware to satisfy the requirement of the process condition.

Based on the above description, the method for obtaining matching the process results among the multiple reaction chambers of the present disclosure adjusting the factor that affects the process results instead of directly adjusting the process results. After adjusting the hardware structures and the hardware component configuration parameters, the method includes adjusting the target value and real value of the factor by setting the adjustment coefficient. The factor and the adjustment coefficient are correlated and stored as the reaction chamber configuration parameters. When the reaction chambers operate the process, the method includes setting the processing parameters according to the factor and the adjustment coefficient to such that the process results of each of the reaction chambers are consistent.

In some embodiments, the methods and apparatus for obtaining matching the process results among the multiple reaction chambers adjust the factor, which affects the process results, to obtain matching results among the multiple chambers. This delivers a more accurate adjustment outcome. This adjustment method is simple and more efficient compared to the current existing technology. By using the adjustment coefficients corresponding to each of the factors, the amount of work related to the hardware adjustment may be reduced. The adjustment coefficient can be used and is suitable for various processes. When different processes are operated, the adjustment coefficients do not require a re-adjustment.

The above-mentioned specific embodiments further describe the purposes, technical solutions, and beneficial effects in detail. The above-mentioned embodiments of the present disclosure are merely specific embodiments and are not used to limit the present disclosure. Any modifications, equivalent replacements, improvements, etc., within the spirit and principles of the present disclosure are within the scope of the present disclosure.

Directional terms mentioned in the embodiments, such as "up," "down," "front," "back," "left," "right," etc., are merely directions of the drawings and are not used to limit the scope of the present disclosure. Through the drawings, the same factor is represented by same or similar signs. The conventional structures and constructs are omitted to avoid obscuring the understanding of the present disclosure.

Unless otherwise known, the numerical parameters in this specification and the appended claims are approximate values and can be changed according to the required characteristics obtained from the content of the present disclosure. All numbers used in the specification and claims to indicate the content of the composition, reaction conditions, etc., should be understood to be described in all cases by the term "about." In general, the "about" means that it includes $\pm 10\%$ changes of a specific number in some embodiments, $\pm 5\%$ changes in some embodiments, $\pm 1\%$ changes in some embodiments, and $\pm 0.5\%$ changes in some embodiments.

The word "include" does not exclude elements or processes, which are not listed in the claims. The word "a" or "an" before an element does not exclude the presence of a plurality of such elements.

Ordinal numbers such as "first," "second," "third," etc., used in the specification and claims to describe the corresponding elements do not imply and represent any order of the elements and do not represent the order of an element and another element, or the order of manufacturing methods. The ordinal numbers are merely used to distinguish an element with a certain name from another element with the same name.

Similarly, to simplify the present disclosure and help understand one or more of disclosed areas, in the above description of the exemplary embodiments of the present disclosure, features of the present disclosure are sometimes grouped together into separate embodiments, figures, or descriptions of the features. This disclosed method should not be construed to reflect the intention that the claimed present disclosure claims more features than the features, which are clearly recorded in each claim. As reflected in the following claims, the disclosure aspect has less features than all features of the single embodiment disclosed previously. Therefore, the claims following the specific embodiments are hereby clearly incorporated into the specific embodiments, where each claim can be a separate embodiment of the present disclosure.

What is claimed is:

1. A matching method for multiple reaction chambers, comprising:
   selecting at least one processing factor;
   applying a target value of the at least one processing factor to each of the reaction chambers and detecting a real value of the at least one processing factor of a corresponding reaction chamber in response to the target value being input to the corresponding reaction chamber, the target value being set identical for the at least one processing factor of the reaction chambers;

applying a fitting method based on the real value and the target value to obtain an adjustment coefficient of the at least one processing factor for each of the reaction chambers, the adjustment coefficient being determined based on a difference between the real value and the target value of the at least one processing factor within a preset accuracy range; and obtaining an input value of the at least one processing factor to enter into each of the reaction chambers based on a product of the target value and the adjustment coefficient corresponding to each of the reaction chambers.

2. The matching method of claim 1, wherein the at least one processing factor includes at least one of an RF power, a process gas flow, or a chamber temperature.

3. The matching method of claim 1, further comprising:
setting the target value of the at least one processing factor when the corresponding reaction chamber operates a process;
using the target value as an input for the at least one processing factor to enter into each of the reaction chambers;
detecting and recording the real value of the at least one processing factor corresponding to each of the reaction chambers; and
obtaining the adjustment coefficient with the fitting method according to the difference between the target value and the real value corresponding to each of the reaction chambers.

4. The matching method of claim 3, wherein the fitting method is a linear fitting or a curve fitting method.

5. The matching method of claim 3, wherein each of the reaction chambers reaches a substantially same process condition corresponding to the target value.

6. The matching method of claim 1, further comprising:
determining whether the real values of the at least one processing factor corresponding to each of the reaction chambers matches with each other;
if the real values match, storing the adjustment coefficients; and
if the real values do not match, returning to a process of setting the adjustment coefficient for the at least one processing factor corresponding to each of the reaction chambers and adjusting the adjustment coefficient.

7. The matching method of claim 1, further comprising:
adjusting hardware structures and hardware configuration parameters of each of the reaction chambers.

8. The matching method of claim 1, wherein:
the at least one processing factor includes a first processing factor and a second processing factor, the target value being a first target value for the first processing factor corresponding to each of the reaction chambers, the real value being a first real value for the first processing factor corresponding to each of the reaction chambers, and the adjustment coefficient being a first adjustment coefficient based on the first target value and the first real value; and
the method further comprises:
applying a second target value of the second processing factor to each of the reaction chambers and detecting a second real value of the second processing factor for a corresponding reaction chamber, the second target value being set identical for the second processing factor of the reaction chambers; and
obtaining a second adjustment coefficient of the second processing factor for each of the reaction chambers based on the second target value and the second real value corresponding to each of the reaction chambers;
wherein the input value to enter to each of the reaction chambers is determined based on a sum of the product of the first target value and the first adjustment coefficient and a product of the second target value and the second adjustment coefficient corresponding to each of the reaction chambers.

9. A matching apparatus for multiple reaction chambers, comprising:
a selection device, configured to select at least one processing factor;
a setting device, configured to:
apply a target value of the at least one processing factor to each of the reaction chambers and detect a real value of the at least one processing factor of a corresponding reaction chamber in response to the target value being input to the corresponding reaction chamber, the target value being set identical for the at least one processing factor of the reaction chambers; and
apply a fitting method based on the real value and the target value to obtain an adjustment coefficient for the at least one processing factor for each of the reaction chambers, the adjustment coefficient being determined based on a difference between the real value and the target value of the at least one processing factor within a preset accuracy range; and
a matching device, configured to obtain an input value of the at least one processing factor to enter into each of the reaction chambers based on a product of the target value and the adjustment coefficient corresponding to each of the reaction chambers.

10. The matching apparatus of claim 9, wherein the at least one processing factor includes at least one of an RF power, a process gas flow, or a chamber temperature.

11. The matching apparatus of claim 9, wherein the setting device includes:
a setting circuit, configured to set the target value of the at least one processing factor when the corresponding reaction chamber operates a process;
a test circuit, configured to use the target value of the at least one processing factor as an input of the at least one processing factor to enter into each of the reaction chambers;
a detection circuit, configured to detect and record the real value of the at least one processing factor corresponding to each of the reaction chambers; and
a fitting circuit, configured to obtain the adjustment coefficient with the fitting method according to the difference between the target value and the real value corresponding to each of the reaction chambers.

12. The matching apparatus of claim 11, wherein the fitting method is a linear fitting or a curve fitting method.

13. The matching apparatus of claim 11, wherein each of the reaction chambers reaches a substantially same process condition corresponding to the target value.

14. The matching apparatus of claim 9, further comprising:
a determining device, configured to determine whether the real values of the at least one processing factor corresponding to each of the reaction chambers match with each other, wherein:

if the real values match, storing the adjustment coefficients; and if the real values do not match, returning to a process of setting the adjustment coefficient for the at least one processing factor corresponding to each of the reaction chambers and adjusting the adjustment coefficient;

a storage device, configured to store the adjustment coefficients; and a repeating device, configured to trigger the setting device to adjust the adjustment coefficients.

15. The matching apparatus of claim 9, further comprising an adjustment device, configured to adjust hardware structures and hardware configuration parameters of each of the reaction chambers.

16. The matching apparatus of claim 15, wherein the adjustment device includes:

a structure adjustment sub-device, configured to adjust assembly positions of hardware according to a requirement of hardware position accuracy; and a parameter adjustment sub-device, configured to adjust an input and an output of the hardware according to a requirement of a process condition.

\* \* \* \* \*